US011001658B2

(12) United States Patent
Haufe et al.

(10) Patent No.: US 11,001,658 B2
(45) Date of Patent: May 11, 2021

(54) SINGLE - OR MULTIPLE COMPONENT COMPOSITION FOR PRODUCING A HYDROGEL

(71) Applicant: SIKA TECHNOLOGY AG, Baar (CH)

(72) Inventors: Markus Haufe, Zürich (CH); Cyrill Gut, Wädenswil (CH)

(73) Assignee: SIKA TECHNOLOGY AG, Baar (CH)

( * ) Notice: Subject to any disclaimer, the term of this patent is extended or adjusted under 35 U.S.C. 154(b) by 150 days.

(21) Appl. No.: 16/087,050

(22) PCT Filed: Mar. 16, 2017

(86) PCT No.: PCT/EP2017/056328
§ 371 (c)(1),
(2) Date: Sep. 20, 2018

(87) PCT Pub. No.: WO2017/162528
PCT Pub. Date: Sep. 28, 2017

(65) Prior Publication Data
US 2019/0300635 A1    Oct. 3, 2019

(30) Foreign Application Priority Data
Mar. 24, 2016 (EP) .................................... 16162363

(51) Int. Cl.
| C08F 220/20 | (2006.01) |
| C08K 3/36 | (2006.01) |
| C08K 3/013 | (2018.01) |
| C08F 220/06 | (2006.01) |
| C08F 220/58 | (2006.01) |
| C08J 3/075 | (2006.01) |
| C08K 5/14 | (2006.01) |
| C08K 5/315 | (2006.01) |
| E04B 1/66 | (2006.01) |
| C04B 28/02 | (2006.01) |
| C08F 2/44 | (2006.01) |
| C04B 111/00 | (2006.01) |

(52) U.S. Cl.
CPC ............ C08F 220/20 (2013.01); C04B 28/02 (2013.01); C08F 220/06 (2013.01); C08F 220/58 (2013.01); C08J 3/075 (2013.01); C08K 3/013 (2018.01); C08K 5/14 (2013.01); C08K 5/315 (2013.01); E04B 1/66 (2013.01); *C04B 2111/00663* (2013.01); *C08F 2/44* (2013.01); *C08F 220/585* (2020.02); *C08L 2201/54* (2013.01)

(58) Field of Classification Search
CPC ......... C08F 220/20; C08K 3/36; C08K 3/013; C09K 34/00; C09K 3/10; C09K 3/1006; C09K 2003/104
See application file for complete search history.

(56) References Cited

U.S. PATENT DOCUMENTS

| 6,066,279 | A * | 5/2000 | Walls ..................... C04B 35/111 264/109 |
| 6,794,439 | B1 * | 9/2004 | Robertson ............. C08F 292/00 524/431 |
| 6,982,288 | B2 * | 1/2006 | Mitra ....................... A61K 6/20 523/120 |
| 8,915,678 | B2 * | 12/2014 | Boulkertous ........... C04B 28/04 405/263 |
| 10,781,346 | B2 * | 9/2020 | Haute ...................... C09K 3/10 |
| 2008/0166410 | A1 | 7/2008 | Funk et al. |
| 2010/0266348 | A1 | 10/2010 | Boulkertous et al. |
| 2014/0312273 | A1 | 10/2014 | Wattebled et al. |

FOREIGN PATENT DOCUMENTS

| CN | 101250313 A | 8/2008 | |
| CN | 104845006 A | 8/2015 | |
| DE | 4214334 A1 * | 11/1993 | ............... C09K 3/10 |
| DE | 4214334 A1 | 11/1993 | |
| EP | 3342801 A1 | 7/2018 | |
| JP | 2009-270048 A | 11/2009 | |
| JP | 2012-236156 A | 12/2012 | |
| RU | 2410999 C2 | 2/2011 | |
| RU | 2537401 C1 | 1/2015 | |
| WO | 00/15353 A1 | 3/2000 | |
| WO | 01/74917 A1 | 10/2001 | |
| WO | 2006/050115 A1 | 5/2006 | |
| WO | 2015/134906 A1 | 9/2015 | |

OTHER PUBLICATIONS

Mar. 19, 2020 Office Action issued in Russian Patent Application No. 2018130505/04(049542).
Apr. 10, 2017 International Search Report issued in International Patent Application No. PCT/EP2017/056328.
Apr. 10, 2017 Written Opinion of the International Searching Authority issued in International Patent Application No. PCT/EP2017/056328.
Jul. 10, 2019 Office Action issued in Chilean Patent Application No. 201802674.
Sep. 26, 2019 Written Opinion issued in Singaporean Patent Application No. 11201807382R.
Apr. 22, 2020 Office Action issued in Colombian Patent Application No. NC2018/0010694.
Jul. 1, 2020 Office Action issued in Chinese Patent Application No. 201780018657.2.
Qi, et al. "Preparation of acrylate polymer/silica nanocomposite particles with high silica encapsulation efficiency via miniemulsion polymerization" Polymer, v. 47, 2006, pp. 4622-4629.

(Continued)

*Primary Examiner* — Rip A Lee
(74) *Attorney, Agent, or Firm* — Oliff PLC

(57) ABSTRACT

A single- or multiple-component composition, which forms upon mixing with water a (meth)acrylic hydrogel and which composition including at least one water soluble at room temperature liquid (meth)acrylic compound supported on a solid carrier and/or an aqueous solution of at least one at room temperature solid or liquid (meth)acrylic compound, a free-radical initiator, and optionally a catalyst for the initiator. A method produces a hydrogel. An acrylic injection material. A method seals cracks, voids, flaws and cavities in building structures.

20 Claims, No Drawings

(56) References Cited

OTHER PUBLICATIONS

Ji, et al. "Core-shell-structured silica/polyacrylate particles prepared by Pickering emulsion: influence of the nucleation model on particle interfacial organization and emulsion stability" Nanoscale Research Letters, 2014, 9:534, pp. 1-9.

* cited by examiner

SINGLE - OR MULTIPLE COMPONENT COMPOSITION FOR PRODUCING A HYDROGEL

TECHNICAL FIELD

The invention relates to compositions used for producing (meth)acrylic hydrogels. The invention also relates to method for producing hydrogels and injection materials from the compositions and to method for sealing and/or filling of cracks, voids, flaws, and cavities in construction industry.

BACKGROUND OF THE INVENTION

Swellable polymer materials such as acrylic based hydrogels are commonly used in construction industry as injection materials or sealants. Hydrogels are produced by polymerizing and cross-linking water-soluble monomer and/or prepolymer compounds in water based solutions or by contacting superabsorbent polymers with water. The polymerization mixture typically comprises, in addition to monomer or prepolymer compounds, an initiator for the polymerization reaction and optionally a catalyst. The monomer and prepolymer compounds must be water-soluble in order to achieve the hydrogel upon polymerization. Monomer and prepolymer compounds which are not water-soluble cause separation of the water from the formed polymer material.

The ingredients for producing hydrogels are usually stored and delivered in a form of two-, three- or four-component compositions or kits due to the reactiveness of the ingredients. In a two-component composition, for instance, one of the components contains the monomer/prepolymer compounds and optionally the catalyst, and the other component contains the initiator. In a three-component composition, the monomer/prepolymer compounds, the initiator, and the catalyst are each provided as a separate component.

One of the disadvantages of the above mentioned multi-component compositions is the excess time needed for mixing several components and the risk that at the time of use the proportions of polymerizable material, initiator and catalyst are not measured correctly resulting in deterioration of the physical properties of the hydrogel.

SUMMARY OF THE INVENTION

The objective of the present invention is to provide a single- or multiple-component composition for producing (meth)acrylic hydrogels, which obviates the disadvantages and drawbacks of state of the art compositions.

According to the invention, the aforementioned objectives are achieved with the single- or multiple-component composition according to claim 1.

The main concept of the invention is that the monomer/prepolymer compounds are present in the single- or multiple component composition as supported on a solid carrier or in solid particulate form. The single- or multiple component composition further comprises a free radical initiator and optionally a catalyst for the free radical initiator.

One of the advantages of the present invention is that the composition can be delivered as a ready-to-use single component package to the construction site and only water has to be added to the composition to initiate the radical polymerization reaction. Consequently, the proportions of the reactive constituents such as the amount of the polymerizable monomer or prepolymer compounds, the amount of the initiator, and the amount of the catalyst can be determined in the manufacturing process. The end user at the construction site has to determine only the correct amount of water to be the added to composition to form a hydrogel with desired physical properties. This not only saves time at the construction site but also reduces the risk that proportions of constituents would be incorrectly measured.

Another advantage of the present invention is that the single- or multiple component composition has a long shelf-life even without the use of polymerization inhibitors since the monomer and/or prepolymer compounds are present in the composition as supported on a solid carrier or in solid particulate form.

In another aspect of the present invention, a method for producing a (meth)acrylic hydrogel, a (meth)acrylic hydrogel obtainable by the method, a (meth)acrylic injection material, and a method for sealing and/or filling of cracks, voids, flaws, and cavities in a building structure, is provided.

DETAILED DESCRIPTION OF THE INVENTION

The term "(meth)acrylic" designates methacrylic or acrylic. Accordingly, (meth)acryloyl designates methacryloyl or acryloyl. A (meth)acryloyl group is also known as (meth)acryl group. A (meth)acrylic compound can have one or more (meth)acryl groups (mono- di-, tri- etc. functional (meth)acrylic compounds).

The term "(meth)acrylic" hydrogel designates a water containing gel, which contains hydrophilic (meth)acrylic polymer. In particular, the hydrophilic (meth)acrylic polymer in the hydrogel is usually crosslinked, e.g. via covalent bonds (chemical gel) or via non-covalent bonds such as ionic interaction or hydrogen bonds (physical gel). A (meth)acrylic polymer is a polymer of one or more (meth)acrylic compounds or monomers and optionally one or more co-monomers, which are co-polymerizable with the (meth)acrylic compounds or monomers.

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "water-soluble compound", e.g. a water-soluble (meth)acrylic compound, designates compounds having a solubility of at least 5 g/100 g water, at a temperature of 20° C.

The term "room temperature" designates a temperature of 23° C.

The term "gelling time" designates a time frame within which a hydrogel is formed once the constituents forming the hydrogel have been mixed with each other.

The term "open time" designates a time period for which the composition can still be processed, such as injected into a crack, after the constituents forming hydrogel have been mixed with each other. The end of the open time is usually associated with such an increase in viscosity of the mixture that processing of the mixture is no longer possible.

The present invention relates in a first aspect of the invention to a single- or multiple-component composition for producing a (meth)acrylic hydrogel comprising constituents:

a) a radical polymerizable monomer or prepolymer system,
b) a free-radical initiator,
c) optionally a catalyst for said initiator,
wherein the radical polymerizable monomer or prepolymer system comprises:
  a1) at least one at room temperature liquid water soluble (meth)acrylic compound supported on at least one solid carrier and/or
  a2) at least one at room temperature solid or liquid water-soluble (meth)acrylic compound dissolved in a liquid solution, preferably in an aqueous solution, which liquid solution is supported on at least one solid carrier.

The term "single-component composition" refers to a composition, in which all the constituents of the composition are contained in one single component. Single-component compositions can be provided packaged in a single compartment or package whereas in two-component or multi-component compositions the components are provided packaged in physically separated compartments or in separate packages.

Single-component reactive systems are used in wide variety of sectors such as in sealants, adhesives, coatings and floor coverings. In these systems, the reactive constituents, e.g. catalyst, cross-linking agent, accelerator or initiator, have to be immobilized in order to prevent initiation of the reaction before the time of use. In case the single-component composition is a moisture or oxygen curing composition, the immobilization of the reactive constituents is accomplished by providing a diffusion barrier between the composition and atmosphere. Premature reaction of the composition can also be prevented by encapsulation of one or more of the reactive constituents, which are then released by rupturing, dissolving or otherwise opening the capsules when the composition is used.

The terms "a compound supported on a solid carrier" and "a compound immobilized on a solid carrier" are used interchangeably and they refer to a compound, which has been substantially completely adsorbed on or absorbed in the solid carrier or encapsulated by the solid carrier. The solid carrier is preferably in the form solid particles, more preferably in form of free-flowing powder. By the term "substantially completely adsorbed on or absorbed in or encapsulated by" is meant that more than 99.0% by weight, preferably more than 99.5% by weight, even more preferably 99.9% by weight, most preferably 100.0% by weight of the liquid compound is adsorbed on or absorbed in the solid carrier or encapsulated by the solid carrier.

In adsorption, the molecules of the liquid component are taken up by the surface of the carrier whereas in absorption, the molecules are taken up by the volume of the carrier. The absorption can be based on a physical or chemical phenomenon (physical/chemical absorption). In encapsulation, the liquid compounds are present in a core, which is surrounded by an encapsulant to form a stable encapsulated particle. A liquid compound supported on a solid carrier is available in form of solid particles, preferably in form of free flowing powder. Liquid compounds that are supported on a solid carrier and are then available as free flowing powder, are also known as dry liquids.

The term "loading of a solid carrier" refers to the weight percentage of the amount of the liquid component supported on the carrier in relation to the total amount of the solid carrier including the liquid compound. For example, in case a liquid compound has been supported on a solid carrier "with a loading of 50% by weight", the solid carrier particles contain 50% by weight of the liquid compound based on the total amount of the solid carrier particles including the amount of the liquid compound.

The maximum amount of a liquid compound that can be supported on a solid carrier depends on the properties of the liquid compound and the solid carrier and on the mechanism by which the liquid compound is supported on the solid carrier. In case the liquid compound is supported to a solid carrier by adsorption, the ability of the solid carrier to uptake the liquid compound depends mainly on the specific surface area of the solid carrier. On the other hand, if the liquid compound is attached to the solid carrier by absorption, the loading degree depends mainly on the swelling properties of the solid carrier.

The term "liquid solution" refers to a homogeneous mixture of two or more substances. In such a mixture, a solute is a substance dissolved in another substance, known as a solvent. The term "aqueous solution" refers to a solution, in which water is the solvent.

The at least one at room temperature liquid or solid water-soluble (meth)acrylic compound may be a monomer, an oligomer or a polymer. The at least one at room temperature liquid or solid water-soluble (meth)acrylic compound may have e.g. a molecular weight or, if it is an oligomer or polymer with a molecular weight distribution, a weight average molecular weight of not more than 12000 g/mol, preferably not more than 8000 g/mol and more preferably not more than 4000 g/mol. The weight average molecular weight can be determined by gel permeation chromatography (GPC) with a polystyrene standard.

The at least one at room temperature liquid or solid (meth)acrylic compound is water-soluble in order to achieve the hydrogel upon polymerization. (Meth)acrylic compounds which are not water-soluble cause separation of the water from the (meth)acrylic polymer formed. Preferably, the at least one at room temperature liquid or solid (meth)acrylic compound has a solubility of at least 5 g/100 g water at a temperature of 20° C. Most preferably water and the at least one at room temperature liquid or solid (meth)acrylic compound are completely soluble in each other, i.e. they form a homogenous phase at any mixing ratio.

The at least one at room temperature liquid or solid water-soluble (meth)acrylic compound may have one, two or more than two (meth)acryloyl groups. Preferably, the at least one at room temperature liquid or solid water-soluble (meth)acrylic compound has one, two or three (meth)acryloyl groups.

The radical polymerizable monomer or prepolymer system preferably comprises at least one at room temperature liquid or solid water-soluble (meth)acrylic compound having one (meth)acryloyl group and at least one at room temperature liquid or solid water-soluble (meth)acrylic compound having two or three (meth)acryloyl groups. Water-soluble (meth)acrylic compounds having four or more (meth)acryloyl groups may be contained in addition, but this is usually not preferred.

One of the characteristics of the present invention is that the single- or multiple-component composition forms a (meth)acrylic hydrogel after being mixed with such an amount of water that in the thus resulting mixture, the weight ratio of the total amount of the water-soluble (meth)acrylic compounds to water is in the range of 0.1 to 5, preferably in the range of 0.1 to 3. In calculating the said weight ratio, the total amount of the water-soluble (meth)acrylic compounds does not include the weight of the at least one solid carrier or the weight of solvent(s) if present in the single- or multiple-component composition.

Preferably, the (meth)acrylic hydrogel is formed in 30 s-240 min, more preferably in 1-120 min, most preferably in 5-90 min after the single- or multiple-component composition has been mixed with water.

Preferably, the single- or multiple-component composition has a shelf life of at least one month, preferably at least two months, most preferably at least six months at a temperature of 50° C. and at a relative humidity of 50%. The term "shelf-life" refers to a period of time for which the composition can be stored at the specified conditions without any significant changes in the application properties and reactivity of the composition. The changes in application properties refer to the changes in open time and/or gelling time and/or swelling properties of the hydrogel.

According to one embodiment, the single- or multiple-component composition is a single-component powder composition, preferably a free flowing powder composition, wherein the constituents a), b), and c) are present in one single component K. The term "free-flowing powder" refers to a powder, in which the particles do not stick together to form aggregates.

In order to create a single-component powder composition, all the compounds contained in the composition have to be present in the composition either in solid state, such as in solid particulate form or as liquid supported on the at least one solid carrier. It is preferable that in case the both constituents b) and c) contain one or more liquid compounds supported on the at least one solid carrier, these liquid compounds are not supported on the same solid carrier in order to prevent a premature reaction of the free-radical initiator and the catalyst for the free-radical initiator.

According to another embodiment, the single- or multiple-component composition is a two component composition composed of a first component K1 and a second component K2, wherein two of the constituents a)-c) are present in a first component K1 and the third constituent is present in a second component K2. The constituents a)-c) can be arranged to the first and second components K1 and K2 in any conventional way, e.g. the constituents a) and b) can be present in the first component K1 and the constituent c) in the second component K2, or constituents a) and c) can be present in the first component K1 and constituent b) in the second component K2, or the constituent a) can be present in the first component K1 and the constituents b) and c) in the second component. The two component composition can be stored in two separate packages or in one package having two chambers that are separated from each other. Suitable two-chamber packaging formats include, e.g., dual cartridges such as twin or coaxial cartridges, multi-chamber poaches or bags with adapters.

Even though the constituents b) and c) can be provided in the same component, it is preferred that they are not provided in the same component in a two-component composition. However, in case the constituents b) and c) are present in the same component of a two-component composition, all the compounds contained in these constituents are preferably either supported on the at least one solid carrier or are in solid particulate form. It is furthermore preferable that in case the constituents b) and c) contain one or more liquid compounds supported on the at least one solid carrier, these liquid compounds are not supported on the same solid carrier in order to prevent a premature reaction of the free-radical initiator and the catalyst for the free-radical initiator.

According to another embodiment, the single- or multiple-component composition is a three component composition composed of a first component K1, a second component K2 and a third component K3, wherein the constituent a) is present in the first component K1, the constituent b) is present in the second component K2, and the constituent c) is present in the third component K3.

There are no particular restrictions for the at least one solid carrier, which can be used to immobilize the liquid compounds contained in the constituents of the single- or multiple-component composition. However, it should be possible to support the liquid compounds on the solid carrier with a reasonably high loading since a too high amount of solid support material has been found to have a negative effect on the application properties of the hydrogel. The suitability of a solid carrier depends also on, which compounds contained in the constituents a), b), and c) is to be supported on it. The (meth)acrylic compounds are preferably supported on the at least one solid carrier with a relatively high loading of at least 30% by weight, more preferably of at least 40% by weight, most preferably at least 50% by weight, due to their high amount in the single- or multiple component composition. On the other hand, initiators and catalyst can be supported on the at least one solid carrier with a lower loading, such as with a loading of at least 5% by weight, more preferably at least 10% by weight, most preferably of at least 15% by weight, without significantly increasing the amount of solid carrier in the single- or multiple component composition. In particular, different solid carriers can be used to support (meth)acrylic compounds, initiators, and catalysts.

In case the liquid compound is supported on the solid carrier mainly by adsorption, the solid carrier preferably has a high specific surface area. Preferably, the at least one solid carrier has a specific surface area measured with a BET method according to EN ISO 9277:2010 standard of 50.0-2000 $m^2/g$, more preferably of 100.0-1500 $m^2/g$, most preferably of 200.0-1000 $m^2/g$.

Preferably, the at least one solid carrier has a median particle size $d_{50}$ of 0.1-1500.0 μm, more preferably of 0.1-1000.0 μm, even more preferably of 1.0-750.0 μm, most preferably of 5.0-500.0 μm.

The term median particle size $d_{50}$ refers to a particle size below which 50% of all particles by volume are smaller than the $d_{50}$ value. The term "particle size" refers to the area-equivalent spherical diameter of a particle. The particle size distribution can be measured by laser diffraction according to the method as described in standard ISO 13320-1:2009.

It can also be preferable that the at least one solid carrier has an adsorption capacity of dioctyl adipate (DOA) of 10-1000 ml/100 g, more preferably 50-750 ml/100 g, even more preferably 50-700 ml/100 g most preferably 75-500 ml/100 g.

Preferably, the at least one solid carrier is selected from the group consisting of particles of perlite, expanded perlite, glass, phonolite, calcium silicates, fumed silica, precipitated silica, silica gel, foamed polyurethane, polysaccharides, expanded vermiculite, clay minerals, fumed metal oxides, zeolites, kieselguhr, and mixtures thereof, more preferably from the group consisting of particles of perlite, expanded perlite, glass, phonolite, calcium silicates, fumed silica, precipitated silica, foamed polyurethane, polysaccharides, expanded vermiculite, clay minerals, kieselguhr, and mixtures thereof.

Preferably, the single- or multiple component composition contains 5.0-90.0% by weight, more preferably 10.0-70.0% by weight, even more preferably 10.0-60.0% by weight, most preferably 15.0-50.0% by weight of the at least one solid carrier, based on the total weight of the single- or multiple component composition. In calculating the total weight of the at least one solid carrier, the weight of the at least one solid carrier does not include the weight of the liquid compounds or solutions supported on the solid carrier.

The at least one at room temperature liquid water-soluble (meth)acrylic compound is preferably selected from the group consisting of hydroxyl-functional (meth)acrylates, carboxyl-functional (meth)acrylic compounds, low molecular weight polyether (meth)acrylates, (meth)acrylamides, or mixtures thereof.

A hydroxyl-functional (meth)acrylate is a (meth)acrylate having one or more hydroxyl groups. Examples of suitable at room temperature liquid water-soluble hydroxyl-functional (meth)acrylates are hydroxyethylmethacrylate (HEMA), hydroxyethylacrylate (HEA), hydroxypropylmethacrylate (HPMA), hydroxypropylacrylate (HPA), hydroxybutylmethacrylate (HBMA) and hydroxybutylacrylate (HBA).

A carboxyl-functional (meth)acrylic compound is a (meth)acrylic compound having one or more carboxylic groups such as e.g. (meth)acrylic acids or (meth)acrylic acids having one or more additional carboxylic groups. Examples of suitable carboxyl-functional at room temperature liquid water-soluble (meth)acrylic compounds and anhydrides thereof are methacrylic acid, methacrylic acid anhydride, acrylic acid, acrylic acid anhydride, and adduct of hydroxyethylmethacrylate.

Polyether (meth)acrylates are polyethers having one, two, three or more (meth)acrylate groups, respectively, preferably at the terminal ends thereof, wherein the polyether is preferably a polyethylene glycol (PEG), a methoxy polyethylene glycol (MPEG), a polyethylene glycol polypropylene glycol (PEG/PPG) copolymer, in particular block copolymer, an ethoxylated trimethylolpropane or an ethoxylated pentaerythritol. When the polyether is a PEG/PPG copolymer or blockcopolymer, respectively, the amount of PEG therein is preferably at least 30% by weight, in order to achieve a suitable water solubility. The polyether (meth)acrylate is preferably a polyether having one (meth)acrylate group or a polyether di(meth)acrylate.

Polyether (meth)acrylates and polyether di(meth)acrylates also include polyethers having one or two (meth)acrylate groups, respectively, wherein the polyether includes further structural units such as urethane groups, e.g. oligomers or prepolymers obtained by reaction of polyetherpolyols, in particular polyetherdiols, or polyethermonools with compounds having two functional groups which are reactive to hydroxyl groups such as polyisocyanates. For instance, polyether (meth)acrylates and polyether di(meth)acrylates may be obtained by reaction of polyetherpolyols or polyethermonools such as PEG, MPEG, PEG-PPG or MPEG-PPG or MPPG-PEG block copolymers, with polyisocyanates to obtain an isocyanate-functional product which is subsequently reacted with a hydroxyl-functional (meth)acrylic compound such as hydroxyethyl methacrylate. With respect to water solubility, also in this case the PEG/PPG blocks preferably have an amount of PEG of at least 30% by weight.

Examples of suitable at room temperature liquid polyether (meth)acrylates and polyether di(meth)acrylates are low molecular weight PEG-di(meth)acrylates such as PEG 200 dimethacrylate, PEG 400 dimethacrylate, PEG 600 dimethacrylate, low molecular weight MPEG-(meth)acrylates such as MPEG 350 (meth)acrylate, and MPEG 550 (meth)acrylate. Such compounds are commercially available, e.g. from Sartomer, France, e.g. SR252 which is polyethylene glycol (600) dimethacrylate, from Geo Specialty Chemicals, USA, e.g. Bisomer MPEG-350MA, which is methoxy polyethyleneglycol methacrylate. The term "low molecular weight PEG/MPEG-di(meth)acrylate" refers here to PEG-di(meth)acrylates having a molecular weight of 700 g/mol or less.

Examples of suitable at room temperature liquid ethoxylated trimethylolpropane (meth)acrylates and ethoxylated pentaerythritol (meth)acrylates are an ethoxylated trimethylolpropane tri(meth)acrylate or an ethoxylated pentaerythritol tetra(methacrylate). Such compounds are commercially available, e.g. from Sartomer Americas, USA, e.g. SR415 which is ethoxylated (20) trimethylolpropane triacrylate (20 mole ethoxylated per mole TMP), SR454 which is ethoxylated (3) trimethylolpropane triacrylate (3 mole ethoxylated per mole TMP) or SR494 which is ethoxylated (4) pentaerythritol tetraacrylate (4 mole ethoxylated per mole PE).

The radical polymerizable monomer or prepolymer system may optionally comprise one or more at room temperature liquid water-soluble co-monomers, which are supported on the at least one solid carrier. These co-monomers are co-polymerizable with the acrylic and/or methacrylic compounds or monomers, respectively. In particular, the water-soluble co-monomers have a solubility of at least 5 g/100 g water at 20° C. It goes without saying that the water-soluble co-monomer is different from the acrylic and/or methacrylic compounds. The water-soluble co-monomer is preferably a vinyl compound such as a vinyl ester, a divinyl ester, a vinyl ether or a divinyl ether, preferably a hydroxyl-functional vinyl ether or a hydroxyl-functional divinylether.

The one or more water-soluble co-monomers, if used, are preferably used in relatively low amounts with respect to the acrylic and/or methacrylic compounds, e.g. in an amount of not more than 15% by weight, preferably not more than 5% by weight, more preferably not more than 1% by weight, based on the total amount of acrylic and/or methacrylic compounds and water-soluble co-monomers contained in the single- or multiple-component component composition.

Preferably the at least one at room temperature liquid water-soluble (meth)acrylic compound is selected from the group consisting of hydroxyethylmethacrylate (HEMA), hydroxypropylmethacrylate (HPMA), low molecular weight polyethylene glycol dimethacrylate (PEG-DMA), and ethoxylated trimethylolpropane tri(meth)acrylate (TMP-TMA), or mixtures of these.

Preferably, the single- or multiple component composition contains 10.0-90.0% by weight, more preferably 12.5-80.0% by weight, most preferably 15.0-75.0% of the at least one at room temperature liquid water-soluble (meth)acrylic compound supported on the at least one solid carrier, based on the total weight of the single- or multiple component composition. In calculating said weight percentages, the amount of the at least one at room temperature liquid water-soluble (meth)acrylic compound does not include the amount of the at least one solid carrier, on which the at least one at room temperature liquid water-soluble (meth)acrylic compound has been supported.

Preferably, the at least one at room temperature liquid water-soluble (meth)acrylic compound is supported on the at least one solid carrier with a loading of at least 10.0% by weight, more preferably of at least 30.0% by weight, even more preferably of at least 40.0% by weight, most preferably of at least 50.0% by weight.

Preferably, the single- or multiple component composition contains 10.0-90.0% by weight of the at least one at room temperature liquid (meth)acrylic compound, based on the total weight of the single- or multiple component composition, which at least one at room temperature liquid water-soluble (meth)acrylic compound is supported on the at least one solid carrier with a loading of 30.0-95.0% by weight, more preferably of 40.0-95.0% by weight, most preferably of 50.0-95.0% by weight.

The at least one at room temperature liquid water-soluble (meth)acrylic compound may also be dissolved in a liquid solution, preferably in an aqueous solution, which liquid solution is supported on the at least one solid carrier with a loading of at least 10.0% by weight, more preferably of at least 30.0% by weight, even more preferably of at least 40.0% by weight, most preferably of at least 50.0% by weight.

Preferably, the concentration of the at least one at room temperature liquid (meth)acrylic compound in the said liquid solution is 10.0-95.0% by weight, more preferably 50.0-95.0% by weight, most preferably 70.0-90.0% by weight, in relation to the total weight of the liquid solution.

According to one embodiment, the radical polymerizable monomer or prepolymer system further comprises:
 a3) at least one at room temperature solid water-soluble (meth)acrylic compound in solid particulate form.

Preferably, the at least one at room temperature solid water-soluble (meth)acrylic compound in solid particulate form has a median particle size $d_{50}$ of less than 5000.0 µm, more preferably of less than 3000.0 µm, even more preferably of less than 1500.0 µm, most preferably of less than 1000 µm.

Preferably, the at least one at room temperature solid water-soluble (meth)acrylic compound is selected from the group consisting of solid carboxyl functional (meth)acrylic compounds, salts of a carboxyl functional (meth)acrylic compounds, high molecular weight polyether (meth)acrylates, (meth)acrylates having a sulfonic acid group, (meth)acrylamides having a sulfonic acid group, salts or esters of (meth)acrylates having a sulfonic acid group, (meth)acrylamides having a sulfonic acid group, (meth)acrylates having a quaternary nitrogen containing group, (meth)acrylamides having a quaternary nitrogen containing group, and mixtures thereof.

Examples of suitable at room temperature solid water-soluble carboxyl functional (meth)acrylic compounds are itaconic acid, maleic acid, maleic anhydride, adduct of maleic anhydride, and succinic acid anhydride.

The cation for the salts mentioned above and below may be any common cation used in such compounds. Examples of suitable salts are metal salts, in particular alkali metal salts or earth alkaline metal salts, such as sodium salts, potassium salts or magnesium salts, or ammonium salts. Examples of suitable salts of carboxyl-functional (meth)acrylic compounds are salts of (meth)acrylic acids such as sodium acrylate, sodium methacrylate, potassium acrylate, potassium methacrylate, magnesium diacrylate and magnesium dimethacrylate.

Examples of suitable at room temperature solid water-soluble polyether (meth)acrylates and polyether di(meth)acrylates are high molecular weight PEG-di(meth)acrylates such as PEG 2000 dimethacrylate and high molecular weight MPEG-(meth)acrylates such as MPEG 1000 (meth)acrylate and MPEG 2000 (meth)acrylate. The terms "high molecular weight PEG-di(meth)acrylate" and "high molecular weight MPEG-(meth)acrylate" refer here to PEG-di(meth)acrylates and MPEG-(meth)acrylates having a molecular weight of more than 700 g/mol, respectively.

Examples of suitable at room temperature solid water-soluble (meth)acrylates or (meth)acrylamides having a sulfonic acid group, and salts or esters thereof are 2-acrylamido-2-methylpropane sulfonic acid (AMPS®) or the sodium salt of 2-acrylamido-2-methylpropane sulfonic acid (Na-AMPS®) and sulfatoethyl methacrylate.

Examples of suitable at room temperature solid water-soluble (meth)acrylates and (meth)acrylamides having a quaternary nitrogen containing group are 2-trimethylammoniummethyl methacrylate chloride and 3-trimethylammoniumpropyl methacrylamide chloride.

Preferably the at least one at room temperature solid water-soluble (meth)acrylic compound is selected from the group consisting of maleic acid, itaconic acid, magnesium diacrylate, sodium acrylate, potassium acrylate, potassium salt of 3-sulfopropylacrylat, high molecular weight PEG-dimethacrylate, 2-acrylamido-2-methylpropane sulfonic acid (AMPS®), sodium salt of 2-acrylamido-2-methylpropane sulfonic acid (Na-AMPS®), and mixtures thereof.

Preferably, the single- or multiple component composition contains 0.0-60.0% by weight, more preferably 0.5-40.0% by weight, most preferably 1.0-20.0% of the at least one at room temperature solid water-soluble (meth)acrylic compound in solid particulate form, based on the total weight of the single- or multiple component composition.

According to one embodiment, the radical polymerizable monomer or prepolymer system comprises at least one at room temperature solid water-soluble (meth)acrylic dissolved in a liquid solution, preferably in an aqueous solution, which liquid solution is supported on the at least one solid carrier, wherein the at least one at room temperature solid water-soluble (meth)acrylic compound is selected from the group consisting of magnesium diacrylate, sodium acrylate, potassium acrylate, potassium salt of 3-sulfopropylacrylat, high molecular weight PEG-dimethacrylate, 2-acrylamido-2-methylpropane sulfonic acid (AMPS®), sodium salt of 2-acrylamido-2-methylpropane sulfonic acid (Na-AMPS®), and mixtures thereof.

Preferably, the single- or multiple component composition contains 10.0-90.0% by weight, more preferably 12.5-80.0% by weight, most preferably 15.0-75.0% by weight of said at least one at room temperature solid water-soluble (meth)acrylic compound dissolved in a liquid solution, based on the total weight of the single- or multiple component composition. In calculating said weight percentages, the amount of the at least one at room temperature solid water-soluble (meth)acrylic compound dissolved in a liquid solution does not include the weight of the at least one solid carrier or the weight of the solvent.

Preferably, said liquid or aqueous solution of the at least one at room temperature solid water-soluble (meth)acrylic compound is supported on the at least one solid carrier with a loading of at least 10.0% by weight, more preferably of at least 30.0% by weight, even more preferably of at least 40.0% by weight, most preferably of at least 50.0% by weight.

Preferably, the concentration of the at least one at room temperature solid (meth)acrylic compound in said liquid or aqueous solution is 10.0-95.0% by weight, more preferably 50.0-95.0% by weight, most preferably 70.0-90.0% by weight, in relation to the total weight of the liquid solution.

The radical polymerizable monomer or prepolymer system can also comprise or consist of a mixture of the at least one at room temperature liquid water-soluble (meth)acrylic compound supported on a first solid carrier and the at least one at room temperature solid (meth)acrylic compound dissolved in a liquid solution, which liquid solution of the at least one at room temperature solid water-soluble (meth)acrylic compound is supported on the first solid carrier or on a second solid carrier. The first and second solid carriers can be of same or of different material.

The radical polymerizable monomer or prepolymer system can also comprise or consist of a mixture of the at least one at room temperature solid water-soluble (meth)acrylic compound in solid particulate form and at least one at room temperature solid (meth)acrylic compound dissolved in a liquid solution, which liquid solution of the at least one at room temperature solid water-soluble (meth)acrylic compound is supported on the at least one solid carrier.

Preferably, the sum of the:
a1) at least one at room temperature liquid water soluble (meth)acrylic compound supported on at least one solid carrier,
a2) at least one at room temperature solid or liquid water-soluble (meth)acrylic compound dissolved in a liquid solution, preferably in an aqueous solution, which liquid solution is supported on at least one solid carrier, and
a3) at least one at room temperature solid water-soluble (meth)acrylic compound in solid particulate form amounts to 10.0-95.0% by weight, more preferably 12.5-90.0% by weight, even more preferably 15.0-85.0%, most preferably 15.0-80.0% by weight of the total weight of the single- or multiple component composition. In calculating said weight percentages, the amounts of a1), a2) and a) do not include the weight of the at least one solid carrier or the weight of solvent(s).

The single- or multiple-component composition can further comprise:
d) at least one inorganic base, preferably an alkali or earth alkali metal oxide or hydroxide, preferably at least one of potassium hydroxide (KOH), calcium hydroxide (Ca(OH)$_2$), sodium hydroxide (NaOH), magnesium hydroxide (Mg(OH)$_2$).

According to one embodiment, the radical polymerizable monomer or prepolymer system comprises at least one at room temperature solid water-soluble (meth)acrylic compound in solid particulate form and/or at least one at room temperature solid water-soluble (meth)acrylic compound dissolved in a liquid solution, preferably in an aqueous solution, which liquid solution of the at least one at room temperature solid water-soluble (meth)acrylic compound is supported on the at least one solid carrier, wherein the at least one at room temperature solid water-soluble (meth)acrylic compound is selected from the group consisting of itaconic acid, maleic acid, maleic anhydride, adduct of maleic anhydride, succinic acid anhydride, and mixtures thereof, and the single- or multiple-component composition further comprises at least one inorganic base, preferably an alkali or earth alkali metal hydroxide, preferably at least one of potassium hydroxide (KOH), calcium hydroxide (Ca(OH)2), sodium hydroxide (NaOH), magnesium hydroxide (Mg(OH)2).

The free-radical initiator serves to initiate polymerization of the (meth)acrylic compounds. These initiators are known to those skilled in the art. The initiator may be e.g. an organic or inorganic hydroperoxide, an organic or inorganic peroxide such as a peroxydisulfate or persulfate salt, an azo compound, or any other material, which is known to the expert of being capable to generate radicals.

According to one embodiment, the free-radical initiator comprises at least one at room temperature solid initiator in solid particulate form. Preferably, said at least one at room temperature solid initiator is selected from the group consisting of azobisisobutyronitrile (AIBN), sodium persulfate (NAPS), potassium persulfate or ammoniumpersulfate, and mixtures thereof.

Preferably, the at least one at room temperature solid initiator in solid particulate form has a median particle size $d_{50}$ of less than 5000.0 µm, more preferably of less than 3000.0 µm, even more preferably of less than 1500.0 µm, most preferably of less than 1000 µm.

Preferably, the single- or multiple component composition contains 0.05-5.0% by weight, more preferably 0.1-3.5% by weight, most preferably 0.1-2.5% by weight of the at least one at room temperature solid initiator in solid particulate form, based on the total weight of the single- or multiple component composition.

According to one embodiment, the free-radical initiator comprises at least one at room temperature liquid initiator supported on the at least one solid carrier. Preferably, said at least one at room temperature liquid initiator is selected from the group consisting of hydrogen peroxide, cumene hydroperoxide, tert-butyl hydroperoxide, diisopropylbenzene hydroperoxide, and mixture thereof.

The at least one at room temperature liquid initiator can be supported on the same solid carrier (the first solid carrier) as the at least one at room temperature liquid (meth)acrylic compound, if present in the single- or multiple-component composition, or on the same carrier (the second solid carrier) as the liquid/aqueous solution of the at least one at room temperature solid water-soluble (meth)acrylic compound, if present in the single- or multiple-component composition. Preferably, the at least one at room temperature liquid initiator is supported on a third solid carrier. The third solid carrier can be of same material as first and second solid carriers or of different material.

Preferably, the single- or multiple component composition contains 0.05-5.0% by weight, preferably 0.1-3.5% by weight, most preferably 0.1-2.5% by weight of the at least one at room temperature liquid initiator supported on the at least one solid carrier, based on the total weight of the single- or multiple component composition. In calculating said weight percentages, the amount of the at least one at room temperature liquid initiator does not include the amount of the at least one solid carrier.

Preferably, the at least one at room temperature liquid initiator is supported on the at least one solid carrier with a loading of at least 5.0% by weight, more preferably of at least 10.0% by weight, even more preferably of at least 15.0% by weight, most preferably of at least 20.0% by weight.

Preferably, the single- or multiple component composition contains 0.05-5.0% by weight of the at least one at room temperature liquid initiator, based on the total weight of the single- or multiple component composition, which at least one at room temperature liquid initiator is supported on the at least one solid carrier with a loading of 30.0-95.0% by weight, more preferably of 40.0-95.0% by weight, most preferably of 50.0-95.0% by weight.

The free-radical initiator can also comprise a mixture of the at least one at room temperature solid initiator in solid particulate form and the at least one at room temperature liquid initiator supported on the at least one solid carrier.

According to one embodiment, the free-radical initiator comprises at least one at room temperature solid initiator dissolved in a liquid solution, preferably in an aqueous solution, which liquid solution is supported on the at least one solid carrier, wherein the at least one at room temperature solid initiator is selected from the group consisting of azobisisobutyronitrile (AIBN), sodium persulfate (NAPS), potassium persulfate or ammoniumpersulfate, and mixtures thereof.

The liquid/aqueous solution of the at least one at room temperature solid initiator can be supported on the same carrier (the first solid carrier) as the at least one at room temperature liquid (meth)acrylic compound, if present in the single- or multiple-component composition, or on the same carrier (the second solid carrier) as the liquid/aqueous solution of the at least one at room temperature solid water-soluble (meth)acrylic compound, if present in the single- or multiple-component composition, or on the same solid carrier (the third solid carrier) as the at least one at room temperature liquid initiator, if present in the single- or multiple-component composition. Preferably, the liquid/aqueous solution of the at least one at room temperature solid initiator is supported on a fourth solid carrier. The fourth solid carrier can be of same material as first, second and third solid carriers or of different material.

Preferably, the single- or multiple component composition contains 0.05-5.0% by weight, more preferably 0.1-3.5% by weight, most preferably 0.1-2.5% by weight of said at least one at room temperature solid initiator dissolved in a liquid solution, based on the total weight of the single- or multiple component composition. In calculating said weight percentages, the amount of the at least one at room temperature solid initiator dissolved in a liquid solution does not include the weight of the at least one solid carrier or the weight of the solvent.

Preferably, said liquid or aqueous solution of the at least one at room temperature solid initiator is supported on the at least one solid carrier with a loading of at least 5.0% by weight, more preferably of at least 10.0% by weight, even more preferably of at least 15.0% by weight, most preferably of at least 20.0% by weight.

Preferably, the concentration of the at least one at room temperature solid initiator in the said liquid or aqueous solution is 10.0-95.0% by weight, more preferably 50.0-95.0% by weight, most preferably 70.0-90.0% by weight, in relation to the total weight of the liquid solution.

The free radical initiator can also comprise a mixture of the at least one at room temperature liquid initiator supported on the at least one solid carrier and the at least one at room temperature solid initiator dissolved in a liquid solution, which liquid solution is supported on the at least one solid carrier.

Preferably, the sum of the said initiators contained in the constituent b) amounts to 0.05-5.0% by weight, more preferably 0.1-3.5% by weight, most preferably 0.1-2.5% by weight of the single- or multiple component composition. In calculating said weight percentages, the amounts of the initiators do not include the weight of the at least one solid carrier or the weight of solvent(s).

The catalyst for the initiator serves to catalyze the polymerization reaction of the (meth)acrylic compounds. The catalyzing effect of the catalyst may be e.g. based on interaction with the initiator promoting radical generation. It is preferable that the single- or multiple component composition further comprises a catalyst for the initiator.

According to one embodiment, the catalyst for the initiator comprises at least one at room temperature solid catalyst in solid particulate form. Preferably, said at least one at room temperature solid catalyst is selected from the group consisting of ascorbic acid, sodium formaldehyde sulfoxylate (SFS), sodium thiosulfate, organic sulfinic acid derivatives and salts thereof such as Bruggolite FF6 and FF7 (commercially available from Bruggeman Chemical), toluidine derivatives, transition metal salts, transition metal complexes, and mixtures thereof.

Preferably, the at least one at room temperature solid catalyst in solid particulate form has a median particle size $d_{50}$ of less than 5000.0 μm, more preferably of less than 3000.0 μm, even more preferably of less than 1500.0 μm, most preferably of less than 1000 μm.

Preferably, the single- or multiple component composition contains 0.05-7.5% by weight, more preferably 0.1-5.0% by weight, most preferably 0.1-3.5% by weight of the at least one at room temperature solid catalyst in solid particulate form, based on the total weight of the single- or multiple component composition.

According to one embodiment, the catalyst for the initiator comprises at least one at room temperature liquid catalyst supported on the at least one solid carrier. Preferably, the at least one at room temperature liquid catalyst is selected from the group consisting of alkanol amines, ethoxylated alkanol amines, and mixtures thereof. The at least one at room temperature liquid catalyst can be selected from the group consisting of diethanolamine (DEA), triethanolamine (TEA), N-Butyldiethanolamine, 2-Amino-2-methyl-1,3-propandiol, dimethylaminopropyl methacrylamide (DMAPMA), dimethylaminoethyl methacrylate (DMAEMA), and mixtures thereof.

The at least one at room temperature liquid catalyst can be supported on the same carrier (the first solid carrier) as the at least one at room temperature liquid (meth)acrylic compound, if present in the single- or multiple-component composition, or on the same carrier (the second solid carrier) as the liquid/aqueous solution of the at least one at room temperature solid water-soluble (meth)acrylic compound, if present in the single- or multiple-component composition. However, the at least one at room temperature liquid catalyst is preferably not supported on the same solid carrier (the third solid carrier) as the at least one at room temperature liquid initiator, if present in the single- or multiple-component composition or on the same solid carrier (the fourth solid carrier) as the liquid/aqueous solution of the at least one at room temperature solid initiator, if present in the single- or multiple-component composition. Preferably, the at least one at room temperature liquid catalyst is supported on a fifth solid carrier. The fifth solid carrier can be of same material as first, second, third and fourth solid carriers or of different material.

Preferably, the single- or multiple component composition contains 0.05-7.5% by weight, more preferably 0.1-5.0% by weight, most preferably 0.1-3.5% by weight of the at least one at room temperature liquid catalyst, based on the total weight of the single- or multiple component composition. In calculating said weight percentages, the amount of the at least one at room temperature liquid catalyst does not include the amount of the at least one solid carrier.

Preferably, the at least one at room temperature liquid catalyst is supported on the at least one solid carrier with a loading of at least 5.0% by weight, more preferably of at least 10.0% by weight, even more preferably of at least 15.0% by weight, most preferably of at least 20.0% by weight.

Preferably, the single- or multiple component composition contains 0.01-7.5% by weight of the at least one at room temperature liquid catalyst, based on the total weight of the single- or multiple component composition, which at least one at room temperature liquid catalyst is supported on the at least one solid carrier with a loading of 30.0-95.0% by weight, more preferably of 40.0-95.0% by weight, most preferably of 50.0-95.0% by weight.

The catalyst for the initiator can also comprise a mixture of the at least one at room temperature solid catalyst in solid particulate form and at least one at room temperature liquid catalyst supported on the at least one solid carrier.

According to one embodiment, the catalyst for the initiator comprises at least one at room temperature solid catalyst dissolved in a liquid solution, preferably in an aqueous solution, which liquid solution is supported on the at least one solid carrier, wherein said at least one at room temperature solid catalyst selected from the group consisting of ascorbic acid, sodium formaldehyde sulfoxylate (SFS), sodium thiosulfate, organic sulfinic acid derivatives and salts thereof such as Bruggolite FF6 and FF7 (commercially available from Bruggeman Chemical), transition metal salts, transition metal complexes, and mixtures thereof.

The aqueous liquid/solution of the at least one at room temperature solid catalyst can be supported on the same carrier (the first solid carrier) as the at least one at room temperature liquid (meth)acrylic compound, if present in the single- or multiple-component composition, or on the same carrier (the second solid carrier) as the aqueous solution of the at least one at room temperature solid water-soluble (meth)acrylic compound, if present in the single- or multiple-component composition, or on the same solid carrier (the fifth solid carrier) as the at least one at room temperature liquid catalyst, if present in the single- or multiple-component composition. However, the aqueous solution of the at least one at room temperature solid catalyst is preferably not supported on the same solid carrier (the third solid carrier) as the at least one at room temperature liquid initiator, if present in the single- or multiple-component composition or on the same solid carrier (the fourth solid carrier) as the aqueous solution of the at least one at room temperature solid initiator, if present in the single- or multiple-component composition. Preferably, the aqueous solution of the at least one at room temperature solid catalyst is supported on a sixth solid carrier. The sixth solid carrier can be of same material as first, second, third, fourth and fifth solid carriers or of different material.

Preferably, the single- or multiple component composition contains 0.05-7.5% by weight, more preferably 0.1-5.0% by weight, most preferably 0.1-3.5% by weight of said at least one at room temperature solid catalyst dissolved in a liquid solution, based on the total weight of the single- or multiple component composition. In calculating said weight percentages, the amount of the at least one at room temperature solid catalyst dissolved in a liquid solution does not include the weight of the at least one solid carrier or the weight of the solvent.

Preferably, said liquid or aqueous solution of the at least one at room temperature solid catalyst is supported on the at least one solid carrier with a loading at least 5.0% by weight, more preferably of at least 10.0% by weight, even more preferably of at least 15.0% by weight, most preferably of at least 20.0% by weight.

Preferably, the concentration of the at least one at room temperature solid initiator in the said liquid or aqueous solution is 10.0-95.0% by weight, more preferably 50.0-95.0% by weight, most preferably 70.0-90.0% by weight, in relation to the total weight of the liquid solution.

The catalyst for the initiator can also comprise a mixture of the at least one at room temperature liquid catalyst supported on the at least one solid carrier at least one at room temperature solid catalyst dissolved in a liquid solution, preferably in an aqueous solution, which aqueous solution is supported on the at least one solid carrier.

Preferably, the sum of the said catalysts contained in the constituent c) amounts to 0.05-7.5% by weight, preferably 0.1-5.0% by weight, most preferably 0.1-3.5% by weight of the single- or multiple component composition. In calculating said weight percentages, the amounts of the catalysts do not include the weight of the at least one solid carrier or the weight of solvent(s).

According to one preferable embodiment, the radical polymerzable monomer or prepolymer system comprises at least one at room temperature liquid water-soluble (meth)acrylic compound supported on a first solid carrier and/or at least one at room temperature solid water-soluble (meth)acrylic compound in solid particulate form, the free radical initiator comprises at least one at room temperature solid initiator in solid particulate form selected from the group consisting of azobisisobutyronitrile (AIBN), sodium persulfate (NAPS), potassium persulfate or ammoniumpersulfate, and the catalyst for the initiator comprises at least one at room temperature solid catalyst in solid particulate form selected from the group consisting of ascorbic acid, sodium formaldehyde sulfoxylate (SFS), sodium salts of organic sulfinic acid derivatives such as Bruggolite, toluidine derivatives, transition metal salts, and transition metal complexes, wherein the first solid carrier is selected from the group consisting of particles of perlite, expanded perlite, glass, phonolite, calcium silicates, fumed silica, precipitated silica, silica gel, foamed polyurethane, polysaccharides, expanded vermiculite, clay minerals, fumed metal oxides, zeolites, kieselguhr, and mixtures thereof.

According to another preferable embodiment, the radical polymerzable monomer or prepolymer system comprises at least one at room temperature liquid water-soluble (meth)acrylic compound supported on a first solid carrier and/or at least one at room temperature solid water-soluble (meth)acrylic compound in solid particulate form, the free radical initiator comprises at least one at room temperature solid initiator in solid particulate form selected from the group consisting of azobisisobutyronitrile (AIBN), sodium persulfate (NAPS), potassium persulfate or ammoniumpersulfate, and the catalyst for the initiator comprises at least one at room temperature liquid catalyst selected from the group consisting of alkanol amines, ethoxylated alkanolamines, and mixtures thereof, preferably from the group consisting of diethanolamine (DEA), triethanolamine (TEA), N-Butyldiethanolamin, 2-Amino-2-methyl-1,3-propandiol, dimethylaminopropyl methacrylamide (DMAPMA), dimethylaminoethyl methacrylate (DMAEMA), and mixtures thereof, which at least one at room temperature liquid catalyst is supported on the first solid carrier or on a second solid carrier, wherein the first and second solid carriers are selected from the group consisting of particles of perlite, expanded perlite, glass, phonolite, calcium silicates, fumed silica, precipitated silica, silica gel, foamed polyurethane, polysaccharides, expanded vermiculite, clay minerals, fumed metal oxides, zeolites, kieselguhr, and mixtures thereof.

According to another preferable embodiment, the radical polymerzable monomer or prepolymer system comprises at least one at room temperature liquid water-soluble (meth)acrylic compound supported on a first solid carrier and/or at least one at room temperature solid water-soluble (meth)acrylic compound in solid particulate form, the free radical initiator comprises at least one at room temperature liquid initiator selected from the group consisting of hydrogen peroxide, cumene hydroperoxide, tert-butyl hydroperoxide, diisopropylbenzene hydroperoxide, which at least one at room temperature liquid initiator is supported on the first solid carrier or on a second solid carrier, and the catalyst for the initiator comprises at least one at room temperature liquid catalyst selected from the group consisting of alkanol amines, ethoxylated alkanolamines, and mixtures thereof, preferably from the group consisting of diethanolamine (DEA), triethanolamine (TEA), N-Butyldiethanolamin, 2-Amino-2-methyl-1,3-propandiol, dimethylaminopropyl methacrylamide (DMAPMA), dimethylaminoethyl methacrylate (DMAEMA), and mixtures thereof, which at least one at room temperature liquid catalyst is supported on the second solid carrier or on a third solid carrier, wherein the first, second and third solid carriers are selected from the group consisting of particles of perlite, expanded perlite, glass, phonolite, calcium silicates, fumed silica, precipitated silica, silica gel, foamed polyurethane, polysaccharides, expanded vermiculite, clay minerals, fumed metal oxides, zeolites, kieselguhr, and mixtures thereof.

The single- or multiple-component composition can further comprise:
  e) at least one filler selected from the group consisting of inert mineral fillers, organic fillers, mineral binders, and mixtures thereof.

The term "filler" refers to solid particulate materials, which have a low adsorption capacity for the liquid components contained in the single- or multiple-component composition of the present invention and, therefore, are not preferably used as solid carriers as described above. Typically, a filler is not suitable for use as the solid carrier since any liquid component contained in the single- or multiple-component composition could be supported on the filler only with very small loading, such as less than 5.0% by weight, preferably less than 2.5% by weight, more preferably less than 2.0% by weight, most preferably less than 1.0% by weight. Although some solid carriers (described above) could be in principle used as filler and vice versa, it is preferred that different materials are used as solid carriers and fillers.

Preferably, the at least one filler also has a water-solubility of less than 0.1 g/100 g water, more preferably less than 0.05 g/100 g water, most preferably less than 0.01 g/100 g water, at a temperature of 20° C.

Preferably, the at least one filler has a particle size $d_{50}$ in the range of 0.1-200.0 μm, more preferably of 0.1-100.0 μm, most preferably 0.1-50.0 μm.

The term "inert mineral filler" refers to mineral fillers that are not chemically reactive. They are produced from natural mineral sources by mining followed by comminution to required particle size and shape. In particular, inert mineral fillers include quartz, ground or precipitated calcium carbonate, crystalline silicas, dolomite, clay, talc, graphite, mica, Wollastonite, barite, diatomaceous earth, and pumice.

The term "organic filler" refers to fillers comprising or consisting of orgnanic materials. In particular, organic fillers include materials comprising or consisting of cellulose, polyethylene, polypropylene, polyamide, polyester, and dispersible polymer compositions such as Vinnapas (from Wacker Chemie AG) and Axilat 8510 (from Hexion).

The term "mineral binder" refers to hydraulic, non-hydraulic, latent binders, and pozzolanic binders. In particular, mineral binders include materials comprising or consisting of cement, cement clinker, hydraulic lime, non-hydraulic lime, and gypsum.

Preferably, the single- or multiple component composition contains 0.0-35.0% by weight, more preferably 1.0-30.0% by weight, most preferably 5.0-25.0% by weight of the at least one filler, based on the total weight of the single- or multiple component composition.

The single- or multiple-component composition may optionally contain inhibitors. Inhibitors are often added to (meth)acrylic compounds, in particular in commercial products, in order to avoid spontaneous polymerization and/or to adjust open times and reaction times, respectively. Examples of suitable inhibitors include butylhydroxytoluene (BTH), hydroquinone (HQ), monomethyl ether hydroquinone (MEHQ), PTZ (phenothiazine), and 4-hydroxy-2,2,6,6-tetramethylpiperidin-1-oxyl (4-hydroxy-TEMPO).

Apart from the above mentioned ingredients, the single- or multiple-component composition may optionally contain one or more further additives, which are common in this field. Examples are, color dyes and water-soluble diluents such as polyethylene glycol. Color dyes may be suitable to label the mixture.

In another aspect of the present invention, a method for producing a (meth)acrylic hydrogel is provided, the method comprising the steps of
  i) Providing a single- or multiple-component composition according to the present invention,
  ii) Mixing the single- or multiple-component composition with water such that in the thus resulting mixture, the weight ratio of the total amount of the water-soluble (meth)acrylic compounds to water is in the range of 0.1 to 5, preferably in the range of 0.1 to 3,
  iii) Letting the mixture form a (meth)acrylic hydrogel.

In calculating said weight ratio of step ii), the total amount of the water-soluble (meth)acrylic compounds does not include the weight of the at least one solid carrier or the weight of solvent(s) if present in the single- or multiple-component composition.

The mixing step ii) is usually carried out by combining the single- or multiple-component composition with water under mixing. Suitable means for mixing are a static mixers and dynamic mixers, in particular container-stirrer type mixers such as rotor-stator type mixers, dissolver mixers, colloidal mixers and other high shear mixers. The choice of suitable mixing apparatus depends on the open time of the composition. In case of long open time, the mixing can be conducted with a container equipped with a stirrer whereas in case of short open time, a static mixer is preferably used in mixing.

Preferably, the time needed to complete step iii) is 30 s-240 min, preferably 1-120 min, most preferably 5-90 min.

The viscosity of the mixture at the beginning is usually relatively low, since the mixture is mainly based on water, water-soluble ingredients, and solid carriers. The viscosity can be adjusted, e.g. by adjusting the ratio of water to the radical polymerizable monomer or prepolymer system and/or by adjusting the molecular weight of the (meth)acrylic compound(s) and/or by adjusting the type and amount of rheology additives and/or by adjusting the type and amount of fillers.

The polymerization reaction preferably takes place at ambient temperatures, e.g. at temperatures in the range of −10 to 60° C., more preferably in the range of 0 to 50° C.

In another aspect of the present invention, a (meth)acrylic hydrogel obtainable by the method as described above, is provided.

In still another aspect of the present invention, a (meth)acrylic injection material is provided, which a (meth)acrylic injection material is obtainable by mixing a single- or multiple-component composition of the present invention with water such that in the thus resulting mixture, the weight ratio of the total amount of the water-soluble (meth)acrylic compounds to water is in the range of 0.1 to 5, preferably in the range of 0.1 to 3. In calculating said weight ratio, the total amount of the water-soluble (meth)acrylic compounds does not include the weight of the at least one solid carrier or the weight of solvent(s) if present in the single- or multiple-component composition.

Preferably, the (meth)acrylic injection material has an open time of 30 s-240 min, preferably 1-120 min, most preferably 5-90 min.

The viscosity of the (meth)acrylic injection material, measured with a Brookfield viscometer at temperature of 23° C. with a rotational speed of the viscometer in the range of 150-200 revolutions per minute, is preferably less than 500 mPa·s, more preferably less than 200 mPa·s, most preferably less than 150 mPa·s. Said viscosity of the (meth) acrylic injection material is measured immediately after the complete dissolution of the constituents of the single- or multiple component composition in water.

In another aspect of the present invention, a method for sealing and/or filling of cracks, voids, flaws, and cavities in a building structure is provided, the method comprising steps of:
i) Providing a single- or multiple-component composition of the present invention,
ii) Mixing the single- or multiple-component composition with water such that the weight ratio of the total amount of the water-soluble (meth)acrylic compounds to water in the mixture is in the range of 0.1 to 5, preferably in the range of 0.1 to 3,
iii) Applying the mixture to the site to be sealed/filled in the building structure and letting the mixture to form (meth)acrylic hydrogel.

In calculating said weight ratio, the total amount of the water-soluble (meth)acrylic compounds does not include the weight of the at least one solid carrier or the weight of solvent(s) if present in the single- or multiple-component composition.

The polymerization reaction starts almost immediately upon mixing of the single- or multiple-component composition and water. Therefore, the step iii) should be started soon after provision of the mixture and in any case within the open time of the mixture.

EXAMPLES

The followings compounds and products, respectively, were used in the examples:

TABLE 1

| | | |
|---|---|---|
| HEMA | Hydroxyethyl methacrylat (HEMA) including 400 ppm hydrochinon monomethylether (HMME) as inhibitor | Visiomer HEMA 98, Evonik Industries |
| ETMA | Ethyltriglycol methacrylate | Visiomer ® ETMA, Evonik Industries |
| MPEG350MA | Methoxy polyethyleneglycol methacrylate, average molecular weight 430 g/mol | Bisomer ® MPEG350MA, Geo Specialty Chemicals, USA |
| SR252 | Polyethylene glycol (600) dimethacrylate, molecular weight 736 g/mol | Sartomer ® SR252, Sartomer, France |
| Potassium acrylate | Potassium acrylate | CAS # 10192-85-5 |
| Potassium methacrylate | Potassium methacrylate | CAS # 6900-35-2 |
| AMPS | 2-Acrylamido-2-methylpropane sulfonic acid, 50% solution in water | AMPS ® 2405, Lubrizol |
| Sipernat 33 | Silicon oxide | Sipernat ® 33, Evonik Industries |
| Vinnapas 7055N | Vinyl acetate, ethylene and vinyl ester | Vinnapas ® 7055 N, Wacker Chemie |
| Vinnapas 5045E | Vinyl acetate, ethylene and vinyl ester | Vinnapas ® 5045 E, Wacker Chemie |
| PUR-mehl | Polyurethan particulate | CAS # 9009-54-5, Beisswenger GmbH |
| Cab-O-Sil M5 | Untreated fumed silica | Cab-O-Sil ® M-5, Cabot Corporation |
| Expanded perlite | Silicous rock | Perlite 0-1 mm, AG für Steinindustrie |
| NAPS | Sodium persulfate (as solid or diluted with water to yield a 20 wt. % solution) | CAS # 7775-27-1 |
| Trigonox TMBH-L | Tetramethylbutylhydroperoxide | Trigonox ® TMBL-L, AkzoNobel |
| Trigonox TAHP-W85 | Tert-Amyl hydroperoxide | Trigonox ® TAHP-W85, AkzoNobel |
| TEA | Triethanolamine (technical grade 85% TEA/15% DEA) | Triethanolamin 85, Ineos Oxide |
| Ascorbic acid | Ascorbic acid | CAS # 50-81-7 |
| Bruggolite FF7 | 2-Hydroxy-2-sulfinatoacetic acid and 2-hydroxy-2-sulfonatoacetic acid with sodium bisulfite | Bruggolite ® FF7, Brügemann Chemical |
| Bruggolite L40 | Composition based on sodium hydroxymethanesulfinate | Bruggolite ® L40, Brügemann Chemical |
| Manganese 10HS | Composition based on metal salts octanoates with 10% manganese | Octa-Soligen ® Manganese 10 HS, OMG Borchers GmbH |
| ABL | Acetylbutyrolactone | CAS #517-23-7 |
| Axilat 8510 | Vinyl acetat copolymer latex | Axilat ® 8510, Hexion |
| Mikrodur R-U | Cement | Mikrodur ® R-U, Dyckerhoff |

The example compositions Ex1 to Ex38 were prepared by supporting the liquid compounds to solid carriers followed by mixing the ingredients with water to provide hydrogel forming mixtures. The mixing of the ingredients was conducted in a dissolver mixer with a mixer speed of 1000 revolutions per minute for three minutes. The ingredients and their amounts in parts by weight (pbw) are presented in Tables 2 to 4.

In the example compositions Ex1-Ex25 and Ex35-Ex38, the liquid triethanolamine (TEA) catalyst supported on Sipernat 33 particles with a loading of 50% by weight (weight ratio TEA:Sipernat was 1:1) was used. The amount TEA in Tables 2-4 refers to the amount of TEA without the solid carrier, if used.

In the example compositions Ex1-Ex24, a sodium persulfate (NAPS) catalyst in solid particulate form was used and in the example compositions Ex25-Ex27 and Ex35-Ex38 an aqueous solution containing 20% by weight of NAPS supported on Sipernat 33 particles with a loading of 50% by weight (weight ratio aqueous solution:Sipernat was 1:1) was used. The amount of liquid compounds supported on a carrier in Tables 2-4 refers to the amount of these compounds without the solid carrier.

In each of the example compositions Ex1 to Ex38, the polymerization started when the ingredients were mixed with water and the mixture was finally transformed into a hydrogel. The properties of the hydrogels were tested in terms of gelling time, gel consistency and swelling. These results are also provided in Tables 2-4. The term "nd" means that the value was not determined.

Loading of Carrier Particles

The liquid compounds were supported on the solid carriers by mixing the carrier particles with the liquid compound in a dissolver mixer using a mixer speed of 2000 revolutions per minute with a mixing time of two minutes.

The loading percentage of the carrier particles was determined based on the measured weights of the particles before and after supporting of the liquid compounds on the particles.

Viscosity

The viscosity was measured before the initiator, such as NAPS, was added to the mixture and before any polymerization reaction took place. A qualitative analysis was carried out by observing the flow behavior of the mixture. In some cases the viscosity could not be determined due to inhomogeneous mixture or too high viscosity of the mixture.

A Brookfield DV2T viscosity measurement apparatus with ULA-DIN-85 spindle was used in viscosity measurements. The diameter of the spindle was 2.55 cm and the diameter of the vessel was 2.7 cm. All viscosities were determined at a temperature of 23° C. and with rotational speed in the range of 150-200 revolutions per minute.

Gelling Time (Min)

The gelling time at 23° C. was determined by visual inspection (gel time is achieved at the time when gel-like structures are detected).

Gel Consistency

The gel consistency of the hydrogel obtained was tested haptically.

Swelling 7 Days in Water

For the measurement of the swelling properties, a test specimen with dimensions of 1.0×1.5×1.5 cm was cut from the hydrogel material produced from each of the example compositions. The test specimens were stored in tap water at a temperature of 23° C. and the change in weigh of the test specimen was determined at the end of the 7 days test period. The hydrogel material was cured for 24 hours before conducting the swelling test. The swelling values presented in Tables 2-4 were determined as the percentage change in weight of the test specimen during the swelling test.

TABLE 2

|  | Ex 1 | Ex 2 | Ex 3 | Ex 4 | Ex 5 | Ex 6 | Ex 7 | Ex 8 | Ex 9 | Ex 10 | Ex 11 |
|---|---|---|---|---|---|---|---|---|---|---|---|
| Ingredients | | | | | | | | | | | |
| HEMA (pbw) | 45.0 | | | | | 30.0 | 40.0 | 43.0 | 43.0 | 43.0 | 43.0 |
| ETMA (pbw) | | 45.0 | 40.0 | | | | | | | | |
| MPEG350MA (pbw) | | | | 45.0 | 40.0 | 15.0 | | | | | |
| SR252 (pbw) | | | 5.0 | | 5.0 | | 5.0 | | | | |
| Potassium acrylate (pbw) | | | | | | | | 2.0 | | | |
| Potassium methacrylate (pbw) | | | | | | | | | 2.0 | | |
| AMPS (pbw) | | | | | | | | | | 2.0 | 2.0 |
| Sipernat 33 (pbw) | 15.0 | 15.0 | 15.0 | 15.0 | 15.0 | 15.0 | 15.0 | 15.0 | 15.0 | 15.0 | 15.0 |
| Carrier loading (wt.-%) | 75 | 75 | 75 | 75 | 75 | 75 | 75 | 75 | 75 | 75 | 75 |
| Water (pbw) | 60.0 | 60.0 | 60.0 | 60.0 | 60.0 | 60.0 | 60.0 | 60.0 | 60.0 | 60.0 | 90.0 |
| $^a$NAPS (pbw) | 0.5 | 0.5 | 0.5 | 0.5 | 0.5 | 0.5 | 0.5 | 0.5 | 0.5 | 0.5 | 0.5 |
| $^b$TEA (pbw) | 1.00 | 1.00 | 1.00 | 1.00 | 1.00 | 1.00 | 1.00 | 1.00 | 1.00 | 1.00 | 1.00 |
| Total (pbw) | 121.5 | 121.5 | 121.5 | 121.5 | 121.5 | 121.5 | 121.5 | 121.5 | 121.5 | 121.5 | 151.5 |
| Results | | | | | | | | | | | |
| Viscosity (mPa · s) (without NAPS) | 22 | 23 | 50 | 45 | 39 | 17 | 25 | 21 | 22 | 26 | 12 |
| Gelling time at 23° C. (min) | 12 | 12 | 120 | 9 | 8 | 15 | 11 | 14 | 12 | 16 | 15 |
| *Gel consistency | M | S | H | H | H | S | M | H | H | H | M |
| Swelling 7 days in water (%) | 7 | nd | 23 | 184 | 196 | 40 | 39 | 88 | 258 | 46 | 30 |

$^a$in solid particulate form
$^b$supported on Sipernat 33 carrier with 50 wt.-% loading
*S = soft, M = medium soft, H = hard

TABLE 3

|  | Ex 12 | Ex 13 | Ex 14 | Ex 15 | Ex 16 | Ex 17 | Ex 18 | Ex 19 | Ex 20 | Ex 21 | Ex 22 | Ex 23 | Ex 24 |
|---|---|---|---|---|---|---|---|---|---|---|---|---|---|
| Ingredients |  |  |  |  |  |  |  |  |  |  |  |  |  |
| HEMA (pbw) | 45.0 | 42.0 | 42.0 | 42.0 | 42.0 | 48.0 | 48.0 | 48.0 | 40.0 | 21.0 | 21.0 | 16.0 | 45.0 |
| SR252 (pbw) |  |  |  |  |  |  |  |  | 8.0 |  |  | 5.0 |  |
| Sipernat 33 (pbw) | 15.0 |  |  |  |  |  |  |  |  |  |  |  |  |
| PUR-mehl |  | 18.0 | 18.0 |  |  |  |  |  |  |  |  |  |  |
| Expanded perlite |  |  |  | 18.0 | 18.0 |  |  |  |  |  |  |  |  |
| Cab-O-Sil M-5 |  |  |  |  |  | 12.0 | 12.0 | 12.0 | 12.0 |  |  |  |  |
| Vinnapas 7055 N |  |  |  |  |  |  |  |  |  | 39.0 | 39.0 | 39.0 |  |
| Vinnapas 5045 E |  |  |  |  |  |  |  |  |  |  |  |  | 55.0 |
| Carrier loading (wt.-%) | 75 | 70 | 70 | 70 | 70 | 80 | 80 | 80 | 80 | 35 | 35 | 35 | 45 |
| Water (pbw) | 90.0 | 75.0 | 90.0 | 70.0 | 90.0 | 90.0 | 132.0 | 152.0 | 132.0 | 45.0 | 60.0 | 60.0 | 45.0 |
| $^a$NAPS (pbw) | 0.5 | 0.5 | 0.5 | 0.5 | 0.5 | 0.5 | 0.5 | 0.5 | 0.5 | 0.5 | 0.5 | 0.5 | 0.5 |
| $^b$TEA (pbw) | 1.00 | 1.00 | 1.00 | 1.00 | 1.00 | 1.00 | 1.00 | 1.00 | 1.00 | 1.00 | 1.00 | 1.00 | 1.00 |
| Total (pbw) | 151.5 | 136.5 | 151.5 | 131.5 | 151.5 | 151.5 | 193.5 | 213.5 | 193.5 | 106.5 | 121.5 | 121.5 | 146.5 |
| Results |  |  |  |  |  |  |  |  |  |  |  |  |  |
| Viscosity (mPa · s) (without NAPS) | 9 | nd | 114 | nd | nd | nd | 34 | 57 | 26 | 703 | 183 | 170 | nd |
| Gelling time at 23° C. (min) | 15 | 16 | 21 | 23 | 20 | 20 | 18 | 21 | 13 | 16 | 15 | 22 | 15 |
| *Gel consistency | M | H | H | H | H | H | S | S | H | S | S | S | M |
| Swelling 7 days in water | 7 | 31 | 26 | 15 | 14 | 39 | 8 | 18 | 6 | 25 | nd | nd | 40 |

$^a$in solid particulate form
$^b$supported on Sipernat 33 carrier with 50 wt.-% loading
*S = soft, M = medium H = hard

TABLE 4

|  | Ex 25 | Ex 26 | Ex 27 | Ex 28 | Ex 29 | Ex 30 | Ex 31 | Ex 32 | Ex 33 | Ex 34 | Ex 35 | Ex 36 | Ex 37 | Ex 38 |
|---|---|---|---|---|---|---|---|---|---|---|---|---|---|---|
| Ingredients |  |  |  |  |  |  |  |  |  |  |  |  |  |  |
| HEMA (pbw) | 22.3 | 22.4 | 22.3 | 22.4 | 22.2 | 22.3 | 22.3 | 22.3 | 22.3 | 22.3 | 45.0 | 45.0 | 45.0 | 45.0 |
| Sipernat 33 (pbw) | 7.8 | 7.8 | 7.8 | 7.8 | 7.7 | 7.7 | 7.7 | 7.8 | 7.8 | 7.7 | 15.0 | 15.0 | 15.0 | 15.0 |
| Carrier loading (wt.-%) | 74 | 74 | 74 | 74 | 74 | 74 | 74 | 74 | 74 | 74 | 75 | 75 | 75 | 75 |
| Water (pbw) | 37.0 | 37.0 | 37.0 | 37.1 | 37.1 | 37.0 | 37.1 | 37.0 | 37.0 | 37.2 | 58.0 | 58.0 | 58.0 | 58.0 |
| $^a$NAPS (pbw) | 2.54 | 2.5 | 2.52 |  |  |  |  |  |  |  | 2.5 | 2.5 | 2.5 | 2.5 |
| $^b$Trigonox TMBH-L |  |  |  | 3.00 | 3.02 | 2.96 | 3.04 |  |  |  |  |  |  |  |
| $^c$Trigonox TAHP-W85 |  |  |  |  |  |  |  | 3.04 | 3.01 | 3.01 |  |  |  |  |
| $^d$TEA (pbw) | 1.01 |  |  |  |  |  |  |  |  |  | 1.00 | 1.00 | 1.00 | 1.00 |
| Ascorbic acid |  | 0.24 |  | 0.26 |  |  | 0.53 |  |  |  |  |  |  |  |
| Bruggolite FF7 |  |  | 1.24 |  | 1.25 |  |  | 1.25 |  |  |  |  |  |  |
| $^e$Bruggolite L40 |  |  |  |  |  | 1.25 |  |  | 1.28 |  |  |  |  |  |
| $^f$Manganese 10 HS |  |  |  |  | 0.65 |  |  |  |  |  |  |  |  |  |
| $^g$ABL |  |  |  |  | 0.64 |  |  |  |  |  |  |  |  |  |
| Filler |  |  |  |  |  |  |  |  |  |  |  |  |  |  |
| Axilat 8510 |  |  |  |  |  |  |  |  |  |  | 10.0 | 20.0 |  |  |
| Cement Microdur R-U |  |  |  |  |  |  |  |  |  |  |  |  | 10.0 | 20.0 |
| Total (pbw) | 70.7 | 70.0 | 70.9 | 70.5 | 71.3 | 71.3 | 71.5 | 70.6 | 71.3 | 71.5 | 131.5 | 141.5 | 131.5 | 141.5 |
| Results |  |  |  |  |  |  |  |  |  |  |  |  |  |  |
| Gelling time at 23° C. (min) | 16 | 10 | 14 | 11 | 6 | 12 | 7 | 5 | 2 | 16 | 19 | 23 | 9 | 10 |
| *Gel consistency | M | S | S | S | S | S | S | S | S | M | H | M | H | H |

$^a$20 wt.-% solution supported on Sipernat 33 carrier with 50 wt.-% loading
$^{b-g}$supported on Sipernat 33 carrier with 50 wt.-% loading
*S = soft, M = medium, H = hard

The invention claimed is:

1. A single- or multiple-component composition for producing a hydrogel comprising constituents:

a) a radical polymerizable monomer or prepolymer system, b) a free-radical initiator, and c) optionally a catalyst for the initiator, wherein
the radical polymerizable monomer or prepolymer system comprises:

a1) at least one at room temperature liquid water-soluble (meth)acrylic compound supported on at least one solid carrier, where the at least one at room temperature liquid water-soluble (meth)acrylic compound supported on the at least one solid carrier is in a form of a powder, and/or a2) at least one at room temperature solid or liquid water-soluble (meth)acrylic compound dissolved in a liquid solution, where the liquid solution is supported on at least one solid carrier, and the liquid solution supported on the at least one solid carrier is in a form of a powder, and optionally at least one of the free-radical initiator and the catalyst, if present, is supported on the at least one solid carrier.

2. The single- or multiple-component composition according to claim 1, wherein
the composition is a single-component powder composition, and
the constituents a), b), and c) are present in a single component K.

3. The single- or multiple-component composition according to claim 1, wherein
the composition is a two component composition composed of a first component K1 and a second component K2,
the first component K1 comprising at least the radical polymerizable monomer or prepolymer system and
the second component K2 comprising the free-radical initiator and optionally the catalyst for the initiator.

4. The single- or multiple-component composition according to claim 1, wherein the at least one solid carrier has a specific surface area in a range of from 50.0 to 2000 $m^2/g$, as measured with a BET method according to ISO EN 9277:2010 standard.

5. The single- or multiple-component composition according to claim 1, wherein the at least one solid carrier is selected from the group consisting of particles of perlite, expanded perlite, glass, phonolite, calcium silicates, fumed silica, precipitated silica, silica gel, foamed polyurethane, polysaccharides, expanded vermiculite, clay minerals, fumed metal oxides, zeolites, kieselguhr, and mixtures thereof.

6. The single- or multiple-component composition according to claim 1, wherein the at least one at room temperature liquid water soluble (meth)acrylic compound, if present, is selected from the group consisting of hydroxyl-functional (meth)acrylates, carboxyl-functional (meth)acrylic compounds, low molecular weight polyether (meth) acrylates, (meth)acrylamides, and mixtures thereof.

7. The single- or multiple-component composition according to claim 1, wherein the radical polymerizable monomer or prepolymer system further comprises:
a3) at least one at room temperature solid water-soluble (meth)acrylic compound in solid particulate form, where the at least one room temperature solid water-soluble (meth)acrylic compound is selected from the group consisting of magnesium diacrylate, sodium acrylate, potassium acrylate, potassium salt of 3-sulfopropylacrylate, high molecular weight PEG-dimethacrylate, 2-acrylamido-2-methylpropane sulfonic acid (AMPS), sodium salt of 2-acrylamido-2-methylpropane sulfonic acid (Na-AMPS), and mixtures thereof.

8. The single- or multiple-component composition according to claim 1, wherein a sum of the water-soluble (meth)acrylic compounds present in the constituent a) is in a range of from 10.0 to 95.0% by weight of a total weight of the single- or multiple component composition.

9. The single- or multiple-component composition according to claim 1, wherein the free-radical initiator comprises (i) at least one at room temperature solid initiator in solid particulate form and/or at least one at room temperature solid initiator dissolved in a liquid solution, where
the liquid solution is supported on the at least one solid carrier, and
the at least one at room temperature solid initiator is selected from the group consisting of azobisisobutyronitrile, sodium persulfate, potassium persulfate or ammoniumpersulfate, and mixtures thereof, and/or (ii) at least one at room temperature liquid initiator supported on the at least one solid carrier, where the at least one at room temperature liquid initiator is selected from the group consisting of hydrogen peroxide, cumene hydroperoxide, tert-butyl hydroperoxide, diisopropylbenzene hydroperoxide, and mixtures thereof.

10. The single- or multiple-component composition according to claim 1, wherein
the catalyst for the initiator comprises
(i) at least one at room temperature solid catalyst in solid particulate form and/or at least one at room temperature solid catalyst dissolved in a liquid solution, where
the liquid solution is supported on the at least one solid carrier, and consisting of ascorbic acid, sodium formaldehyde sulfoxylate, 2-hydroxy-2-sulfinatoacetic
the at least one at room temperature solid catalyst is selected from the group acid and/or salt thereof, 2-hydroxy-2-sulfonatoacetic acid and/or salt thereof, toluidine derivatives, transition metal salts, transition metal complexes, and mixtures thereof, and/or
(ii) at least one at room temperature liquid catalyst supported on the at least one solid carrier, where the at least one at room temperature liquid catalyst is selected from the group consisting of alkanol amines, ethoxylated alkanol amines, and mixtures thereof.

11. The single- or multiple-component composition according to claim 1 further comprising:
e) at least one filler selected from the group consisting of organic fillers, inert mineral fillers, mineral binders, and mixtures thereof.

12. A method for producing a (meth)acrylic hydrogel comprising
i) providing a single- or multiple-component composition according to claim 1,
ii) mixing the single- or multiple-component composition with water to form a mixture such that a weight ratio of a total amount of the water-soluble (meth)acrylic compounds to water in the mixture is in a range of from 0.2 to 3, and
iii) letting the mixture form (meth)acrylic hydrogel.

13. A (meth)acrylic hydrogel obtained by the method according to claim 12.

14. A (meth)acrylic injection material obtained by mixing a single- or multiple-component composition according to claim 1 with water to form a mixture such that that a weight ratio of a total amount of the water-soluble (meth)acrylic compounds to water in the mixture is in a range of from 0.2 to 3.

15. A method for sealing and/or filling of cracks, voids, flaws and cavities in a building structure, the method comprising
i) providing a single- or multiple-component composition according to claim 1,
ii) mixing the single- or multiple-component composition with water to form a mixture such that a weight ratio of a total amount of the water-soluble (meth)acrylic compounds to water in the mixture is in a range of from 0.2 to 3, and iii) applying the mixture to the site to be sealed/filled in the building structure and letting the mixture to form (meth)acrylic hydrogel.

16. The single- or multiple-component composition according to claim 1, wherein the constituent a2) consists of the at least one solid carrier and at least one at room temperature solid or liquid water-soluble (meth)acrylic compound dissolved in a liquid solution, and the at least one room temperature solid or liquid water-soluble (meth)acrylic compound in constituent a2) consists of at least one selected from the group consisting of a hydroxyl-functional (meth)acrylates, a carboxyl-functional (meth)acrylic compound, a low molecular weight polyether (meth)acrylates, a salt of a carboxyl functional (meth)acrylic compound, a high molecular weight polyether (meth)acrylate, a (meth)acrylate having a sulfonic acid group, a (meth)acrylamide having a sulfonic acid group, a salt or an ester of a (meth)acrylate having a sulfonic acid group, a (meth)acrylate having a quaternary nitrogen containing group, and a (meth)acrylamide having a quaternary nitrogen containing group.

17. A single-component composition comprising constituents:
  a) a radical polymerizable monomer or prepolymer system,
  b) a free-radical initiator, and
  c) optionally a catalyst for the initiator,
  wherein
  the radical polymerizable monomer or prepolymer system comprises:
    a1) at least one at room temperature liquid water-soluble (meth)acrylic compound supported on at least one solid carrier and/or
    a2) at least one at room temperature solid or liquid water-soluble (meth)acrylic compound dissolved in a liquid solution, where the liquid solution is supported on at least one solid carrier,
  the single-component composition is present in a form of a powder, and
  the constituents a), b), and c), if present, are present in a single component.

18. The single-component composition according to claim 17, wherein the at least one solid carrier is selected from the group consisting of particles of perlite, expanded perlite, glass, phonolite, calcium silicates, fumed silica, precipitated silica, silica gel, foamed polyurethane, polysaccharides, expanded vermiculite, clay minerals, fumed metal oxides, zeolites, kieselguhr, and mixtures thereof.

19. The single-component composition according to claim 17, wherein the at least one at room temperature liquid water soluble (meth)acrylic compound, if present, is selected from the group consisting of hydroxyl-functional (meth)acrylates, carboxyl-functional (meth)acrylic compounds, low molecular weight polyether (meth)acrylates, (meth)acrylamides, and mixtures thereof.

20. The single-component composition according to claim 17, wherein a sum of the water-soluble (meth)acrylic compounds present in the constituent a) is in a range of from 10.0 to 95.0% by weight of a total weight of the single-component composition.

* * * * *